(12) United States Patent
Manini et al.

(10) Patent No.: US 7,226,552 B2
(45) Date of Patent: Jun. 5, 2007

(54) PROCESS FOR INTRODUCING AN INSULATING SYSTEM IN AN INTERSPACE

(75) Inventors: Paolo Manini, Arluno (IT); Pierattilio Di Gregorio, Sulmona (IT); Ruggero Tiberi, Avezzano (IT)

(73) Assignee: Saes Getters S.p.A., Lainate (Milano) (IT)

( * ) Notice: Subject to any disclaimer, the term of this patent is extended or adjusted under 35 U.S.C. 154(b) by 498 days.

(21) Appl. No.: 10/909,891

(22) Filed: Aug. 2, 2004

(65) Prior Publication Data

US 2005/0005571 A1    Jan. 13, 2005

Related U.S. Application Data

(63) Continuation of application No. PCT/IT2003/00058, filed on Feb. 7, 2003.

(30) Foreign Application Priority Data

Feb. 11, 2002 (IT) .......................... MI2002A0255

(51) Int. Cl.
*B29C 44/06* (2006.01)
*B29C 44/12* (2006.01)

(52) U.S. Cl. .................. 264/46.5; 264/46.4; 264/46.6; 264/271.1

(58) Field of Classification Search ............... 264/46.4, 264/46.5, 46.6, 271.1; 428/69, 71
See application file for complete search history.

(56) References Cited

U.S. PATENT DOCUMENTS

| | | | |
|---|---|---|---|
| 4,059,660 A * | 11/1977 | Roth et al. ................. | 264/46.4 |
| 5,256,467 A * | 10/1993 | Kato .......................... | 428/182 |
| 5,939,212 A | 8/1999 | Ragland et al. | |
| 6,771,183 B2 * | 8/2004 | Hunter .................. | 340/870.01 |

FOREIGN PATENT DOCUMENTS

| | | |
|---|---|---|
| DE | 44 18 108 A1 | 11/1995 |
| EP | 0 757 920 A2 | 2/1997 |
| EP | 0 769 117 B1 | 9/1998 |
| WO | WO 01/51860 A2 | 7/2001 |

* cited by examiner

*Primary Examiner*—Allan R. Kuhns
(74) *Attorney, Agent, or Firm*—Akin Gump Strauss Hauer & Feld LLP

(57) ABSTRACT

A process is provided for producing an insulating system, comprising at least a vacuum insulating panel (20; 30) in a matrix of homogeneous polymeric foam (602; 707), inside an interspace (101; 703) of a device which must subsequently be subjected, at least at the interspace, to a temperature higher than 100° C., without damaging this system and without causing it to lose its original insulating properties, by providing a flexible protection system of cardboard.

18 Claims, 4 Drawing Sheets

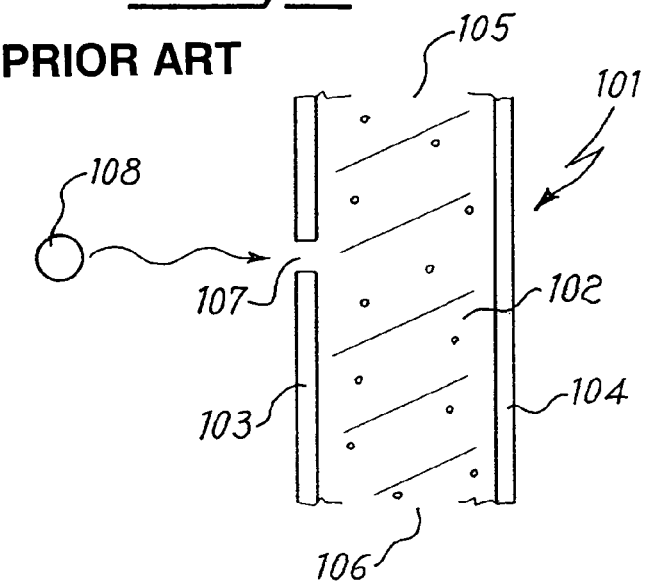
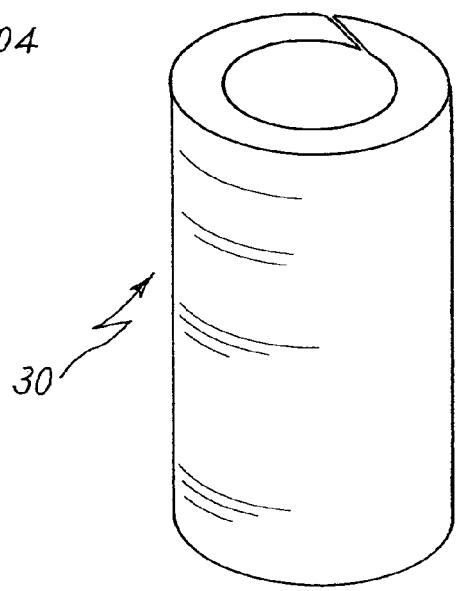
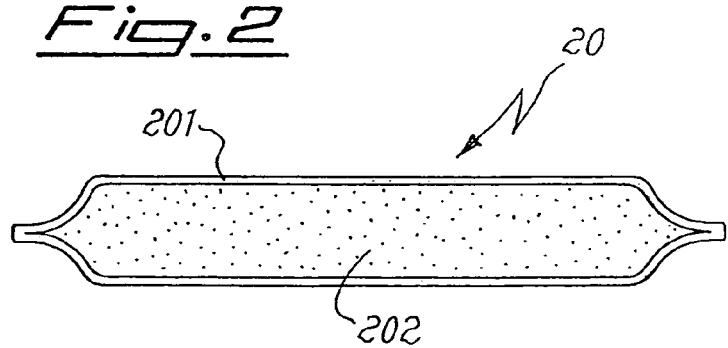

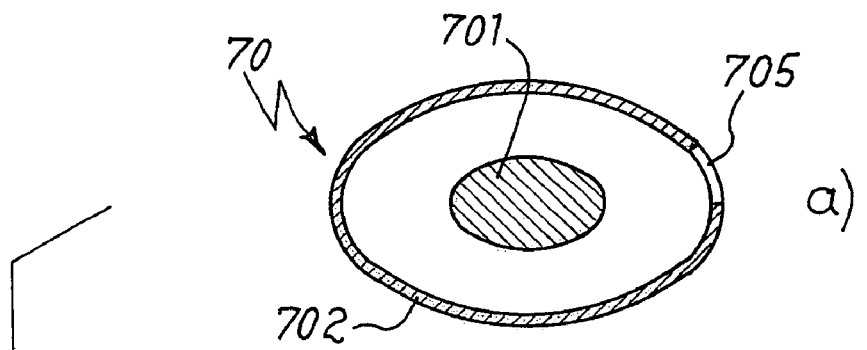
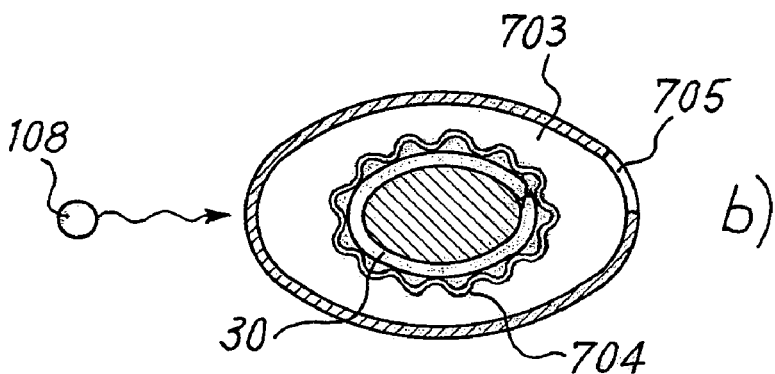
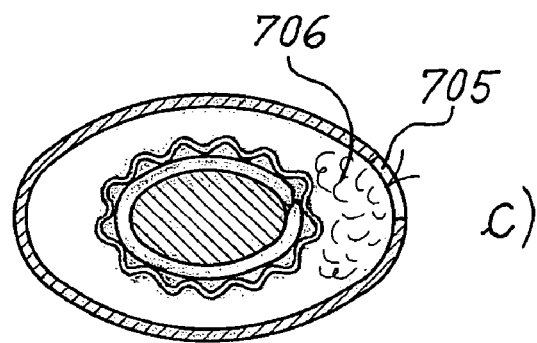
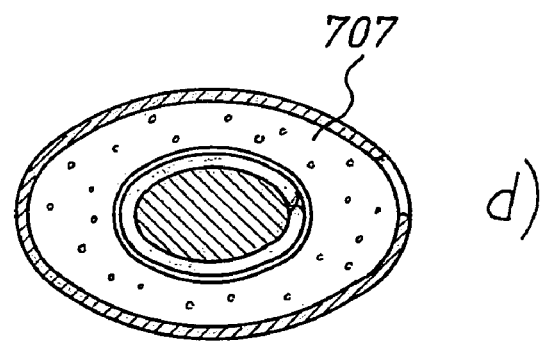
Fig. 7

PROCESS FOR INTRODUCING AN INSULATING SYSTEM IN AN INTERSPACE

CROSS-REFERENCE TO RELATED APPLICATIONS

This application is a continuation of International Application No. PCT/IT03/00058, filed Feb. 7, 2003, the disclosure of which is incorporated herein by reference.

BACKGROUND OF THE INVENTION

The present invention relates to a process for introducing an insulating system inside an interspace.

Interspaces containing an insulating system have different applications, among which are Dewar flasks for the storage of cryogenic liquids, piping for the transportation of such liquids, beverage dispensing machines (wherein thermo-insulation is required mainly in order to separate the portion for the hot drinks, generally at about 70° C., from the portion for the cold drinks), containers for isothermal transportation, for example of drugs or cold or frozen food, refrigerators, and boilers.

It is commonly known for thermal insulation to use vacuum interspaces containing insulating materials, such as glass wool, colloidal silica, pearlite, and, particularly, organic polymers in the form of foams, for example open-celled rigid polyurethane.

To improve the performance of the insulating system it could be optimal to improve these insulating materials by utilization of vacuum insulating panels, known in the art by the acronym VIP.

As known, a vacuum panel is formed of an envelope inside which a filling material is present.

The envelope has the function of preventing or reducing, as much as possible, the inlet of atmospheric gases inside the panel, so as to keep a vacuum level compatible with the thermo-insulating level required by the application. For this purpose, the envelope is made with so-called "barrier" sheets, characterized by a gas permeability as low as possible, which can be formed of a single component, but more commonly of multi-layers. In this last case, the barrier effect is conferred by one of the component layers, while the other layers generally have functions of mechanical support and protection of the barrier layer.

The filling material also has the function of spacing apart the two opposite faces of the envelope when vacuum is created in the panel. During the panel evacuation, in fact, the envelope adheres to the filling material, because of the difference between the external atmospheric pressure and the internal reduced pressure of the panel. This filling material can be inorganic, such as silica powder, glass fibers, aerogels, diatomaceous earth, etc., or organic, such as rigid foams of polyurethane or polystyrene, both in the form of boards and of powders. Anyway, the filling material must be porous or discontinuous, so that the pores or the interstices can be evacuated.

Since the permeation of traces of atmospheric gases into the panel is practically unavoidable, in most cases these panels also contain one or more getter materials capable of sorbing these gases, so as to maintain the pressure inside the panel at the desired values. Preferred is the use of systems with two or three getter materials, containing at least a chemical moisture sorber and at least one component chosen among an oxide of a transition metal (having the main function of sorbing hydrogen, CO and hydrocarbons), and an alloy based on barium and lithium (having the main function of sorbing nitrogen). Various getter systems of this kind are sold by the assignee of the present application SAES Getters S.p.A. under the trademark COMBOGETTER®, among which are, in particular, systems containing a moisture sorber and alloy powder based on barium and lithium, disclosed in European Patent EP 0 769 117 B; and getter systems containing a moisture sorber and an oxide of a transition metal, with the optional addition of powder of an alloy based on barium and lithium, disclosed in European Patent EP 0 757 920 B.

Vacuum panels, and particularly those made with plastic materials, have found so far a growing use in every sector where thermal insulation is required at temperatures lower than about 100° C.

At temperatures higher than 100° C., in fact, the panel starts to deteriorate irreversibly and to release non-negligible amounts of gas, thus making it impossible to use it in all those applications whose productive processes comprise the introduction of the panel in the interspace before a heating step to be carried out at temperatures in excess of 100° C.

This limitation is onerous, since high temperature thermal treatments are often necessary, while the demand for a very good thermal insulation becomes more pressing every day.

This situation occurs unavoidably in the production of all those devices which have to be assembled before heating beyond 100° C., for example in the case of boilers.

Schematically, they are formed of an internal heating body, inserted in an external envelope, calendered and closed at its ends by two plates, the envelope having such dimensions to form with the internal body an interspace, wherein the insulating material, preferably polymeric foam, is inserted.

So far, boilers have been manufactured by a production process which can be summarized in the following way: introduction of the body of the boiler inside the external envelope, closing the ends with proper plates, thermal treatment at about 170° C. in a furnace, cooling to about 60° C., introduction into the interspace of precursors of the melted polymeric foam through apposite openings, polymerization of the precursors, and final cooling to room temperature.

The thermal treatment at 170° C. is necessary, because the external envelope of the boilers and the tops have previously been treated with powder paint, which must be desiccated in a furnace to give the coating characteristics of thermal and mechanical resistance, in particular anti-scratching properties. This operation is carried out once the structure of the boiler has been assembled, so as to minimize production times and related costs.

The need for this high temperature treatment has so far prevented insulating vacuum panels from being used in boilers, since they should be unavoidably inserted in the interspace of the boiler before closing thereof during assembly, thus before heating at high temperature.

International published patent application WO 01/51860 discloses a boiler having in the interspace an insulating system formed of a certain number of insulating panels submerged in polymeric foam, but the problems above mentioned, relative to the production process, are not solved.

BRIEF SUMMARY OF THE INVENTION

The object of the present invention is to provide a process for inserting an insulating system comprising at least an insulating vacuum panel in a matrix of homogeneous polymeric foam, inside an interspace of a device which must subsequently be subjected, at least at the interspace, to a temperature higher than 100° C., without damaging this system and without causing the loss of its original insulating properties.

This object is achieved by a process for introducing in an interspace an insulating system comprising at least a vacuum insulating panel submerged in a matrix of homogeneous polymeric foam, comprising the steps of introducing the panel into the interspace, heating the interspace at a temperature of at least 100° C. by a heat source placed outside the interspace, filling the free internal space between the walls of the interspace with melted polymeric foam, cooling and solidifying the foam, characterized in that, before heating from outside the interspace at a temperature of at least 100° C., the following steps are carried out:

- preparing a flexible protection system of cardboard comprising at least a sheet having indentations and projections with respect to an average surface;
- introducing into the interspace the protection system in such a way that the protection system is placed at least in the space between the wall of the interspace which separates the interior of the interspace from the heat source outside the interspace and the surface of the insulating panel facing the wall, and that in the space the protection system defines the presence of chambers containing air.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 shows a sectional view of an interspace with a filling based on polymeric foam, obtained with a process of the prior art;

FIG. 2 shows a sectional view of a plane panel;

FIG. 3 shows a cylindrical panel;

FIG. 7 illustrates schematically the different steps in the assembly of a boiler, using the process of the invention to introduce the protection (insulating) system inside the interspace of the boiler.

DETAILED DESCRIPTION OF THE INVENTION

Figure 4:
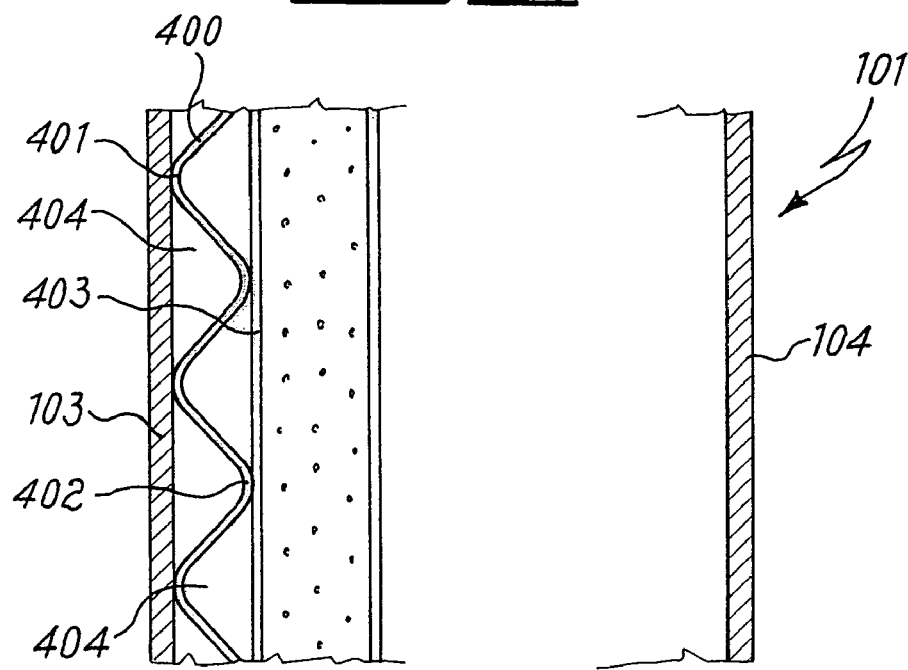
FIG. 4 and FIG. 5 show two possible combinations of the configuration/position of the protection system of the panel inside the interspace.

FIG. 1 shows the interspace 101 of a generic device which must be subjected to a thermal treatment at a temperature higher than 100° C. Usually, in these cases, the foam 102 is inserted between the walls 103, 104 of the interspace after the thermal treatment. This is possible because at least one of the two walls 103 and 104 of the interspace, or upper end 105 or lower end 106, is provided with openings 107 through which are introduced precursors of the polymeric foam which react in the same interspace, thereby filling it homogeneously. Once the precursors have been fed into the interspace, the openings can be eliminated, for example by small tight stoppers. Different polymeric foams can be used, preferably polyurethane foams, obtained from condensation reaction between polyisocyanates and polyalcohols. Generally, the interspace is heated to a temperature of about 60° C., before the introduction of the precursors, by heating with a heat source 108 outside a wall 103 of the interspace, so that during its formation the polymeric foam maintains such a mobility to fill the empty space homogeneously and uniformly, even in the case of the presence of interstices of small size or of non regular shape.

FIG. 2 shows a section of a plane panel 20, which can be used in the process of the invention. The panel, having the shape of a parallelepiped, comprises an envelope 201 containing a filling material 202, which can be optionally of inorganic or polymeric type, discontinuous or porous. The envelope 201 can be formed of two barrier sheets, as shown in the FIG. 2, whose edges are joined by sealing, or it can be formed of only one barrier sheet, folded and sealed on itself. The panels can be U-shaped, by an operation of simple manual folding or by calendering, and even closed, as shown in FIG. 3, so as to obtain a hollow cylinder 30.

By the process of the invention one or more panels are inserted in the inner space of the interspace, preferably in contact with at least one of the walls thereof, and the remaining free space is filled by the homogeneously distributed polymeric foam.

In order to protect the panel from damage and loss of its functionality when subjected to a critical heating by the heat source outside the interspace, a system made of cardboard is inserted between the wall dividing the inner space of the interspace and the surface of the panel facing the wall. The shape and position of the system determine together a protective action towards the panel.

This system is, in fact, configured and placed in the interspace in such a way to ensure the presence of air chambers between the wall and the surface of the panel, and comprises at least a cardboard sheet having indentations and/or projections with respect to an average (planar) surface.

It has been found that the air chambers are capable of retarding the transfer of heat coming from the source outside the interspace, so that a thermal treatment at a temperature higher than 100° C., carried out for periods of even about 30 minutes, is innocuous for the panel.

FIG. 4 shows a possible combination shape/position of the protection system of the panel. In this case the panel is intended to be put in contact with wall 103, which separates the inner space of the interspace and the heat source 108 (not shown here) outside the interspace, by placing between the wall and the surface of the panel facing it, and in contact with both of them, a protection system formed of at least a cardboard sheet having indentations and/or projections with respect to an average surface. Since the system is in contact with the panel and the wall, in order to form air chambers, it is sufficient to use only one sheet 400 having indentations or projections or both of them with respect to an average surface. In FIG. 4 is shown a possible configuration of this sheet, whose cross section resembles a sinusoidal wave, called "wavy" or "corrugated". Indentations 401 and projections 402 are tangential, respectively, to wall 103 of interspace 101 and to the surface of panel 403 and form parallel air canals 404.

For the sake of simplicity, in FIG. 4 a wavy sheet is exemplified, but many other shapes are suitable for the same application. Furthermore, it is to be noted that the presence of the sheet having indentations and/or projections is a condition necessary and sufficient to form air chambers, but the sheet could be put in contact with the wall and/or the surface of the panel by one or more planar cardboard sheets, which constitute with the former a multilayer protection system.

Preferably the protection system is put in contact with the panel before it is inserted in the interspace.

Figure 5:
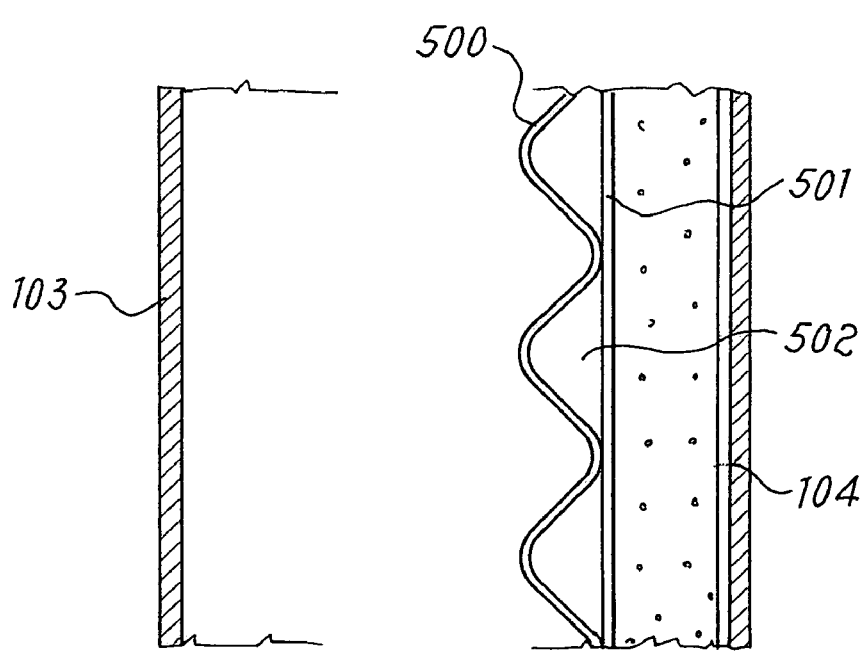

In FIG. 5 another possible combination shape/position of the protection system of the panel is shown. In this case the panel is intended to be put in contact with wall 104 of the interspace, opposite to wall 103 which receives heat directly from the source 108 outside the interspace (not shown in the FIG. 5). The protection system, which in this case must also be inserted in the space between the panel and the wall of the interspace dividing the interior of the interspace and the heat source outside the interspace, could be placed at any point inside the space. Preferably, it is put in contact with the surface of the panel facing the interior of the interspace, since this allows prior preparation of the "protected panel" and insertion thereof by a single operation into the interspace during the production process of the final device. Protection system 500, hence, covers surface 501 of the panel facing the interior of the interspace and forms with it protective air chambers 502. Also in this case, there is shown a protection system formed of a single wavy sheet, but a multilayer system could also be used, having for example a planar sheet placed between the wavy one and the panel surface and/or a planar sheet placed over the wavy one and turned toward the inner space of the interspace.

It is to be noted that the panel can be of different shapes, as already described with reference to FIG. 2, and that the protection systems illustrated in FIGS. 4 and 5 would have to be worked accordingly, carrying out, for example, a calendering of the same in the case they have to protect a U-shaped panel.

In the case of multilayer protection systems, the term "planar" refers to the sheet which can be placed over the one having indentations and/or projections with respect to an average surface, before a possible calendering of the protection system.

Furthermore, it is to be noticed that the presence of the cardboard protection system inside the space between the panel and the wall of the interspace dividing the interior of the interspace from the heat source outside the interspace, is a condition necessary and sufficient to protect the panel during the high temperature heating step, but the system could comprise also a sheet having indentations and/or projections with respect to an average surface, placed in the space between the panel and the other wall of the interspace, or even cover the panel completely.

Once the panel and its protection system have been inserted into the interspace, preferably covering the panel with the system and inserting the "protected panel" so obtained, the following process steps are carried out: thermal treatment, cooling, inserting in the interspace the precursors of the foam and formation of the foam, and final cooling.

Figure 6:
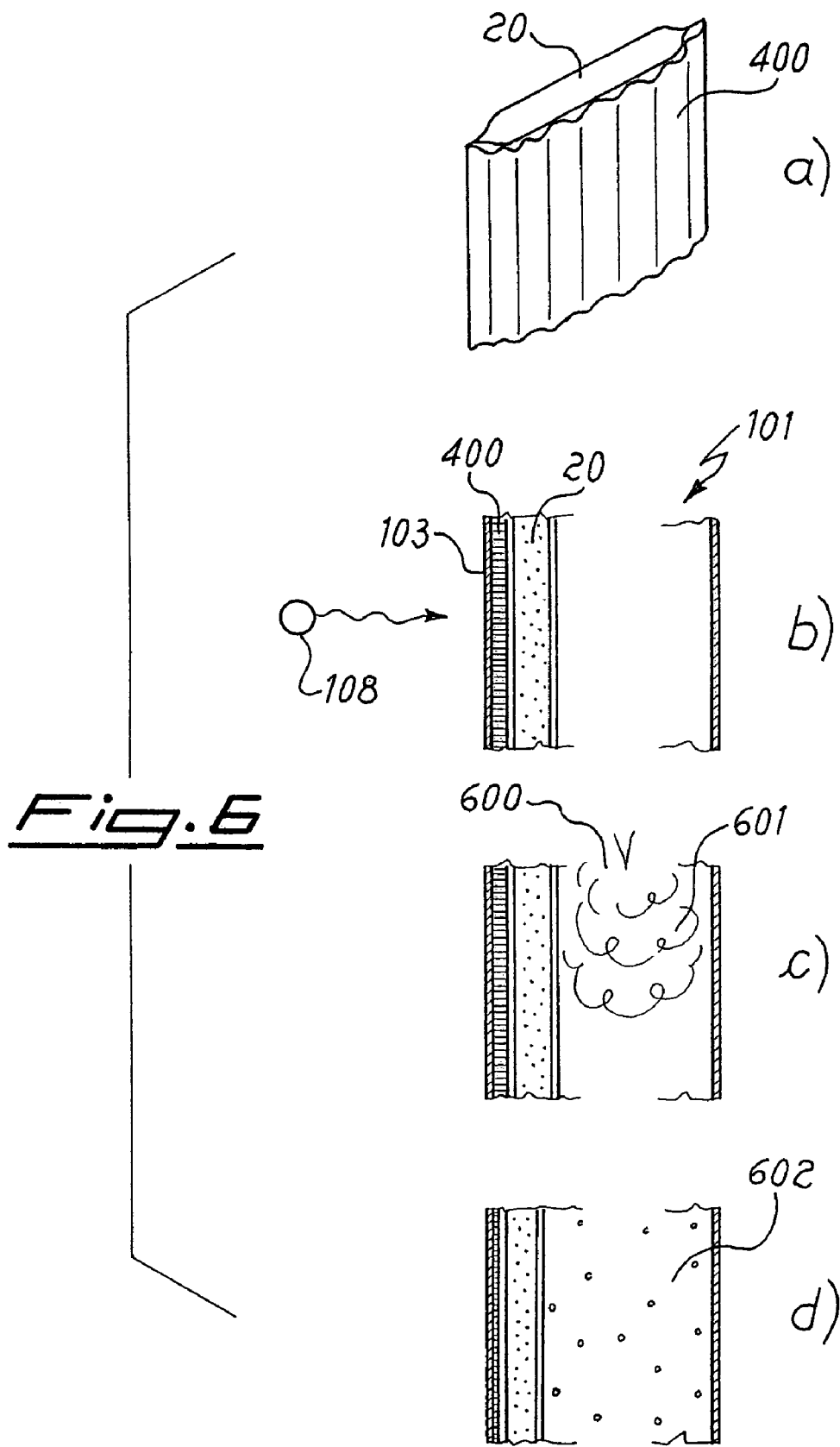
FIG. 6 illustrates schematically the process of the invention.

FIG. 6 shows schematically the steps (a)–(d) which constitute sequentially the process of the invention, referring to the combination configuration/position described in FIG. 4. Panel 20 is previously coated by the protection system 400 (6a). The so obtained "protected panel" is inserted into interspace 101 in contact with wall 103 and thermal treatment at a temperature higher than 100° C. is carried out (6b), at the end of which the assembly is cooled down to about 50–60° C., and the precursors of the polymeric foam 601 are inserted through openings 600 into the interspace (6c). The precursors inside the interspace polymerize forming a foam 602 which occupies the whole free space (6d).

The pressure of the fluid precursors entering the interspace and the polymerization/reticulation of the foam further force the vacuum panel against the wall of the interspace and cause at the same time the squashing of the cardboard protection system 400, whose lower thickness make its presence negligible inside the interspace (6d).

FIG. 7 shows schematically how the process of the invention can be applied to production of boilers. The internal heating body 701 of the boiler 70 is inserted into the calendered external envelope 702 (7a), and panel 30 coated by the protection system 704 is placed into the obtained interspace 703 (7b). It is to be noticed that the panel is illustrated towards the internal wall, as shown in FIG. 5, but could be placed as described with reference to FIG. 4 or in any other suitable position, provided it is protected from external heating by the cardboard protection system. The ends are closed with proper tops and the boiler 70 so assembled is placed in furnace 108, in order to desiccate the powder paint previously deposited on external envelope and tops. The thermal treatment is generally carried out at 175° C. for a 20 minutes period. The boiler is then allowed to cool down to about 60° C., and polymeric precursors 706 are introduced into the interspace through opening 705 (7c). The precursors polymerize forming a homogeneous foam 707 in the volume of the interspace not occupied by the panel (7d). Protection system 704 is not shown in FIG. 7d, as it has been squashed by foam 707.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A process for producing, in an interspace (101; 703) of a device, an insulating protection system formed of at least a vacuum insulating panel (20; 30) submerged in a matrix of homogeneous polymeric foam (602; 707), comprising the steps of introducing the panel into the interspace defined by first and second opposing walls (103, 104) while leaving a free internal space between the panel and at least one of the walls, heating the interspace at a temperature of at least 100° C. by a heat source located outside the interspace, filling the free internal space between the walls of the interspace with fluid polymeric foam, cooling and solidifying the foam, wherein the following steps are carried out before heating the interspace at temperature of at least 100° C.:

providing a flexible protection system of cardboard (400; 500; 704) with at least one sheet having indentations and/or projections with respect to an average surface; and introducing the protection system into the interspace in such a way that the protection system is placed at least in a portion of the interspace between the first wall (103) which separates an interior of the interspace from the heat source outside the interspace, and a surface (403; 501) of the insulating panel facing the first wall (103), wherein the protection system defines in the portion of the interspace chambers containing air (404; 502).

2. The process according to claim 1, comprising the following series of consecutive steps:

introducing the vacuum insulating panel into the interspace;

providing the flexible protection system of cardboard with at least one sheet having indentations and/or projections with respect to an average surface;

introducing the protection system into the interspace in such a way that the protection system is placed at least in a portion of the interspace between the first wall which separates an interior of the interspace from the heat source outside the interspace, and a surface of the insulating panel facing the first wall, wherein the protection system defines in the portion of the interspace chambers containing air; and heating the interspace at least at 100° C.

3. The process according to claim 1, comprising the following series of consecutive steps:

providing the flexible protection system of cardboard with at least one sheet having indentations and/or projections with respect to an average surface;

covering at least one surface of the vacuum insulating panel with the protection system;

introducing the protection system into the interspace in such a way that the protection system is placed at least in a portion of the interspace between the first wall which separates an interior of the interspace from the heat source outside the interspace, and a surface of the insulating panel facing the first wall, wherein the protection system defines in the portion of the interspace chambers containing air; and heating the interspace at least at 100° C.

4. The process according to claim 3, wherein the covered surface of the panel is placed in contact with the first wall of the interspace which separates the interior of the interspace from the heat source outside the interspace.

5. The process according to claim 4, wherein the protection system is formed of a wavy cardboard sheet.

6. The process according to claim 4, wherein the protection system is formed of a wavy cardboard sheet and a planar cardboard sheet placed thereon.

7. The process according to claim 4, wherein the protection system is formed of a wavy cardboard sheet and planar cardboard sheets placed upon both surfaces thereof.

8. The process according to claim 3, wherein a surface of the panel opposite to the covered surface is placed in contact with the second wall of the interspace (104) opposite to the first wall separating the interior of the interspace from the heat source outside the interspace.

9. The process according to claim 8, wherein the protection system is formed of a wavy cardboard sheet.

10. The process according to claim 8, wherein the protection system is formed of a wavy cardboard sheet and a planar cardboard sheet placed thereon.

11. The process according to claim 8, wherein the protection system is formed of a wavy cardboard sheet and planar cardboard sheets placed upon both surfaces thereof.

12. The process according to claim 1, wherein the panel is planar.

13. The process according to claim 1, wherein the panel is U-shaped.

14. The process according to claim 1, wherein the panel has a shape of a hollow cylinder.

15. The process according to claim 1, wherein the first wall (103) of the interspace separates the interior of the interspace from the outside of the device, and the second wall (104) separates the interior of the interspace from the inside of the device.

16. The process according to claim 15, wherein the device is a boiler (70) and the walls of the interspace (703) coincide with an the external envelope (702) and an internal heating body (701) of the boiler.

17. The process according to claim 1, wherein the polymeric foam is a polyurethane foam.

18. The process according to claim 1, wherein the panel contains a getter system.

* * * * *